United States Patent

Louis et al.

[11] 3,898,102
[45] Aug. 5, 1975

[54] BIPOLAR LOW-PRESSURE ELECTRODE FOR GAS FUEL CELLS

[75] Inventors: Gerhard Louis, Hofheim; Harald Böhm, Glashutten, both of Germany

[73] Assignee: Licentia-Patent-Verwaltungs-G.m.b.H., Frankfurt am Main, Germany

[22] Filed: Mar. 21, 1973

[21] Appl. No.: 343,477

[30] Foreign Application Priority Data
Mar. 24, 1972 Germany............................ 2214412

[52] U.S. Cl................................................ 136/86 D
[51] Int. Cl..................... H01m 27/00; H01m 27/04
[58] Field of Search.......... 136/10, 86 R, 121, 86 D, 136/120 FC

[56] References Cited
UNITED STATES PATENTS

| | | | |
|---|---|---|---|
| 3,188,242 | 6/1965 | Kordesch et al. | 136/86 R |
| 3,413,239 | 11/1968 | Obstowski et al. | 136/121 |
| 3,416,965 | 12/1968 | Boies et al. | 136/86 R |
| 3,533,847 | 10/1970 | Maurer | 136/86 R |
| 3,690,954 | 9/1972 | Warszawski et al. | 136/86 R |

*Primary Examiner*—John H. Mack
*Assistant Examiner*—H. A. Feeley
*Attorney, Agent, or Firm*—Spencer & Kaye

[57] ABSTRACT

In a gas fuel cell there are provided bipolar low-pressure electrodes each formed of a flexible graphite foam foil carrying active electrode layers on opposite faces. The gas-side face of each active electrode layer is provided with raised portions which, together with the adjoining foil face, define a channel system forming a closed gas chamber. The raised portions are so arranged that the gas which enters and leaves the gas chamber through an inlet opening and an outlet opening provided in the active electrode layer is substantially evenly distributed over the entire area of the gas-side face of the active electrode layer.

8 Claims, 5 Drawing Figures

BIPOLAR LOW-PRESSURE ELECTRODE FOR GAS FUEL CELLS

BACKGROUND OF THE INVENTION

The present invention relates to a bipolar low-pressure electrode for gas fuel cells.

Bipolar electrodes for alkaline and acid fuel cells are known in the art. In alkaline fuel cells the gas chamber and the contacting separator wall are frequently formed by metallic components having the configuration of a corrugated sheet. In case of bipolar low-pressure electrodes operating in acid electrolytes, such a solution is not feasible, since there are no contact metals available which would be suitable from an economical point of view. In fuel cells containing an acid electrolyte it is known to form the gas chamber and the contacting separator wall (cell wall) by a bilaterally ribbed plate which is made either of sintered ceramic rendered conductive by mixing thereto gold particles or by a rigid electrographite having a contacting anode and cathode applied to opposite faces. For the purpose of introducing and distributing the gas fuel, the electrode has an open channel system formed of parallel webs extending over the entire width of the electrode. Thus, the gas enters the channel system at one side of the electrode, then it is guided lengthwise by the parallel webs and eventually it is taken out at the opposite side of the electrode. For the intake and outlet of the gas large slots are provided. The aforeoutlined design preconditions that the inlet and outlet slots merge into wide supply channels which have to be provided additionally at the outside of the battery. These channels significantly increase the overall volume of the battery.

It is further known to embed the electrode layers by their edges entirely rigidly into a filler or to glue them into a special frame. In either case the operation of the electrode and the layers gives rise to difficulties from a mechanical point of view. Since the support material always has properties different from the electrode material proper (different coefficient of expansion) and, accordingly, the two materials behave in a different manner, mechanical stresses will appear in the electrode layers. In battery designs having a frame structure, further difficulties reside in the withdrawal of the gas at the frame edge and care has to be taken that the latter joins the electrode layer in an entirely fluid-tight manner. Such a feature, however, cannot be maintained for a protracted period of time because of the temperature-dependent stress conditions. A further difficulty resides in the fact that the channel provided for guiding the gas is not closed by sealing material.

It is an object of the invention to provide an improved bipolar low-pressure electrode in which the gas may flow without substantial pressure loss freely over the entire electrode face, thus permitting the use of large-surface electrodes and an operation with non-purified gases.

It is a further object of the invention to provide an improved bipolar low-pressure electrode in which the sealing of the gas inlet and gas outlet is effected in a simple manner.

It is also an object of the invention to provide an improved bipolar low-pressure electrode that operates without moisture repellent properties at the gas side which would limit the life expectancy and lock the electrolyte.

It is still another object of the invention to provide an improved bipolar low-pressure electrode in which the electrode is built without metal for purposes of contacting and for the separation of electrolyte and gas.

SUMMARY OF THE INVENTION

These and other objects to become apparent as the specification progresses are accomplished by the invention according to which, briefly stated, the electrode comprises a flexible graphite foam foil to which there are bilaterally applied active electrode layers that leave a free edge zone at the foil and which, at the gas side, are provided with a channel system constituting a closed gas chamber. The channel system is formed by raised portions provided on the gas-side face of each active layer. The latter have throughgoing openings to constitute an access for the air and the fuel gas to the gas chamber.

DESCRIPTION OF THE PREFERRED EMBODIMENTS

Figure 1:
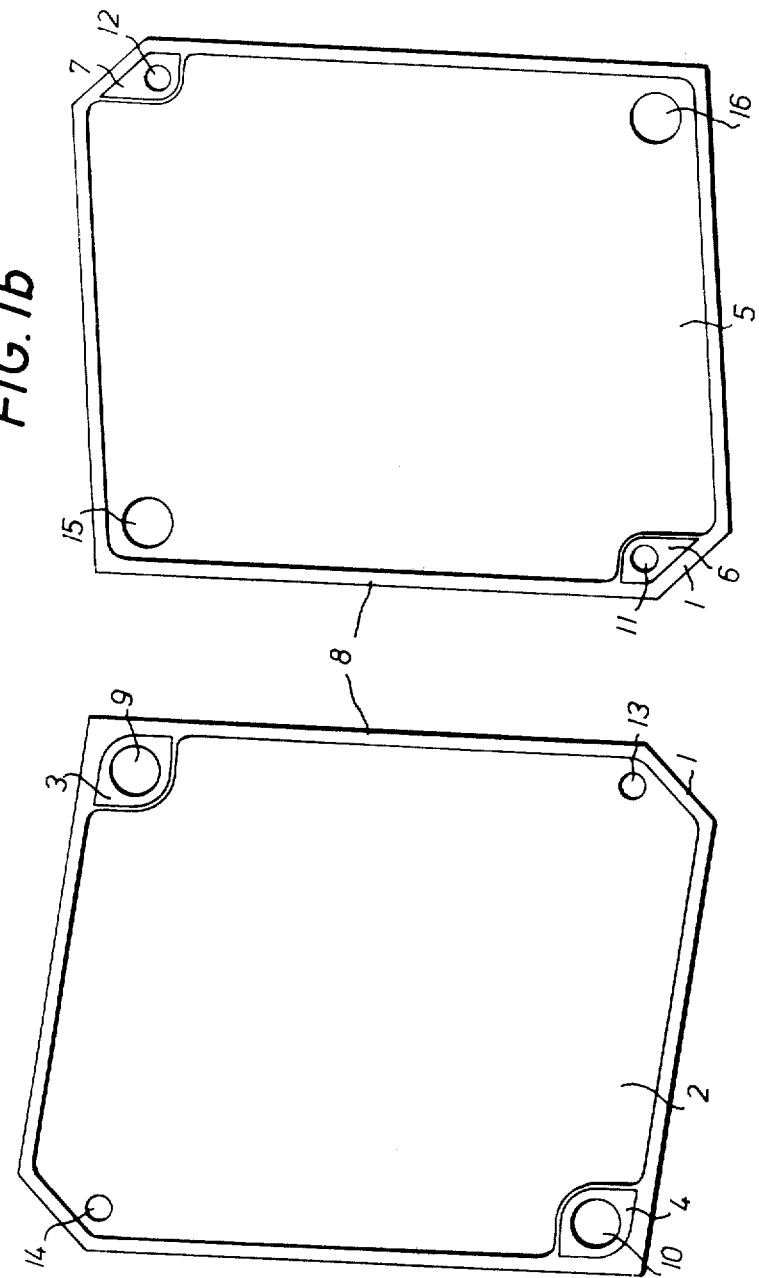
FIGS. 1a and 1b are side elevational views of opposite faces of an electrode according to the invention.

Turning now to FIGS. 1a and 1b, the bipolar electrode comprises an electronically contacting flexible foil 1 which separates gas and electrolyte from one another and which is formed of a strong graphite foam of approximately 0.2 millimeter thickness. To one side of the foil there is applied an anode layer 2 and two sealing elements 3 and 4 (FIG. 1a) while on its other side there is provided a cathode layer 5 and two sealing elements 6, 7 (FIG. 1b). The area of each layer 2, 5 is smaller than that of the corresponding face of the graphite foam foil 1 so that a free foil margin 8 is obtained which provides a surface for an electrolyte-tight, elastic clamping of the electrode layers 2, 5 while leaving the edge zones of the latter free. The electrolyte (not shown) is in contact with the outer faces of the layers 2, 5. The anode layer 2 is made, for example, of tungsten carbide with polytetrafluoroethylene (PTFE), while the cathode layer is made, for example, of activated carbon with PTFE.

The sealing elements 3, 4 with the holes 9, 10 provided in the foil 1 serve as a coupling for the air supply to the next electrode while the sealing elements 6, 7 with the holes 11, 12 provided in the foil 1 function as a coupling for the gas fuel supply to the next electrode. The anode layer 2 has inlet and outlet openings 13 and 14 which are in alignment with the respective holes 11 and 12 while the cathode layer 5 has inlet and outlet openings 15, 16 that are in alignment with the holes 9, 10. The anode layer 2 is in a face-to-face engagement with the graphite foam foil 1 while overlapping the holes 11, 12 but circumventing the sealing elements 3, 4. The cathode layer 5 is in a face-to-face engagement with the graphite foam foil 1 while overlapping the holes 9, 10 but circumventing the sealing elements 6, 7. An electronically conducting bond between the anode layer 2, the cell wall 1 and the cathode layer 5 may be effected, for example, by gluing these components together with a two-component hardenable resin under a pressure of approximately 100 kp/cm² or by means of synthetic material sintering under pressure.

Figure 2:
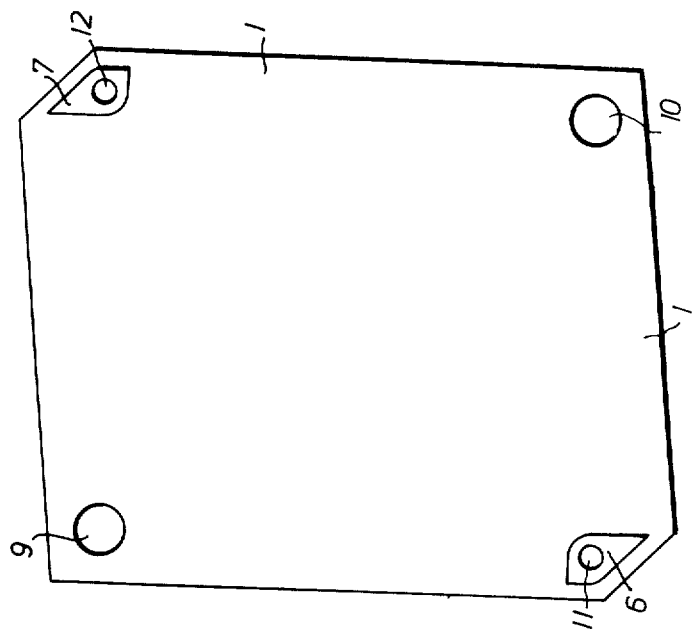
FIG. 2 is a side elevational view of a component forming part of the electrode and shown in the absence of an active electrode layer thereon.

The graphite foam foil 1 which is illustrated in FIG. 2 in the absence of the active electrode layer, serves, in addition to its function as a cell wall, for the transmission of current from one layer to the other. By means of the graphite foam foil 1 there is achieved a direct, large-surface contacting between the anode 2 and the cathode 5. In this manner, extremely short current paths are obtained which are of particular significcance in fuel cells having acid electrolyte, because for such fuel cells no technically satisfactory contacting and current conducting materials are available. Such materials, for the purpose of obtaining light-weight components with small ohmic losses should have a very good conductivity. The design according to the invention thus makes it possible to use materials of lesser conductivity by using as large-surface electrodes without current carrying elements, catalyst layers that are bound by a synthetic material.

As it has been mentioned earlier, the anode layer 2 and cathode layer 5 are attached to one another by the graphite foam foil 1. The electrode is secured by engagement of the margin 8 of the graphite foam foil 1 and thus, consequently, the electrode layers 2, 5 do no longer have to be clamped at their edges. The holding means for the margin 8 may be provided either by gluing it into a frame or by pouring on the foil 1 an appropriate immobilizing material with the aid of appropriate seals or solely by mechanical clamping.

The graphite foam foil 1 has the following functions:
1. it is a dividing cell wall separating the electrolytes from cell to cell;
2. it is a dividing gas wall separating two different gases from one another;
3. it provides a marginal zone for clamping and holding securely the bipolar electrode so that, as a result, a blocking in the battery is obtained; and
4. it serves as a contact element for the contacting of the anode and the cathode.

Figure 3:
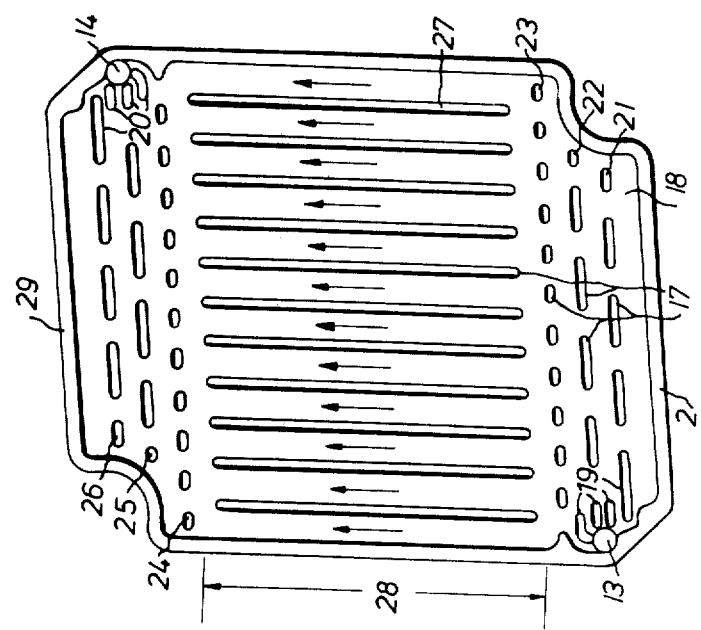
FIG. 3 is a side elevational view, from the gas side, of an active electrode layer.

Turning now to FIG. 3, there is shown the gas-side face of the anode layer 2. FIG. 3 shows the anode layer 2 separated from the foil 1 to render the gas-side face of the anode layer 2 visible. The gas-side face is thus oriented toward the graphite foam foil 1 as opposed to the electrolyte-side face which is oriented away from the foil 1 and which is visible in FIG. 1a. It is to be understood that while in the structural description which follows particular reference will be made mostly to the anode layer 2, such statements also apply to the other active electrode layer, that is, the cathode layer 5 which is of a structure identical to that of the anode layer 2.

As it may be observed in FIG. 3, the anode layer 2 has an elevated, continuous perimetric edge 29 which is bonded to the graphite foam foil 1. Although the latter differs from the active layers regarding the coefficients of expansion, but since both layers are made of a highly porous elastic skeleton structure, even in case of substantial temperature fluctuations no harmful stresses appear between the bonded layers 1, 2, 5.

An improved strength of the electrode layers 2 and 5, as well as a superior protection against short-circuiting within the battery may be achieved by providing the electrode faces with sintered-on non-woven glass fiber or similar fibrous insulating material.

The two electrode layers 2 and 5 operate as gas diffusion electrodes and are, together with the graphite foam foil 1, utilized to form a gas-guiding channel system. For this purpose the electrode layers 2, 5 have, at their face oriented towards the foil 1 — that is, on their respective gas-side face — raised portions (such as webs or ribs) 17 which project in the same direction and have the same height as the perimetric edge 29. Thus, the gas is situated between the graphite foam foil 1 and the electrode layer 2. The channel system which communicates with the two diagonally oppositely located inlet and outlet openings 13, 14 of the anode layer 2 ensures a uniform distribution of the gas flow over the entire electrode face and also provides, between the two openings 13, 14, a gas flow over the electrode surface without appreciable loss of pressure. In low-pressure electrodes this feature is of primary importance concerning the operation of large-surface electrodes that utilize air and fission gases since the latter, due to the high proportion of inert gas, require a substantial flow for effecting removal thereof.

As noted earlier, the same type of raised portions provided at the gas side of the anode layer 2 is also present on the gas-side face of the cathode layer 5. Preferably, the arrangement of the raised portions on both electrode layers 2 and 5 is identical. Consequently, the graphite foam foil is on each side engaged by exactly aligned webs, so that when the electrode layers 2 and 5 are bonded under pressure to the graphite foam foil 1, a slippage or deformation of the foil 1 will not occur.

The raised portions 17 effect a uniform distribution of the gas flow. In the absence of these raised portions the gas would flow from the inlet 13 diagonally to the outlet 14 so that large portions of the gas-side face 18 of the anode layer 2 would not be contacted by the gas. Thus, the raised portions 17 ensure that the gas is distributed uniformly over the entire gas-side face 18 of the anode layer 2. By virtue of the raised portions the gas is constrained to follow paths along the face of the electrode layer other than a diagonal direction, since the flow resistances are practically identical along a number of paths from the inlet 13 to the outlet 14. To accomplish this result, at the inlet and the outlet 13 and 14 guide webs 19 and 20 (a first group of raised portions 17) are provided which are joined by rows 21, 22, 23 (a second group of raised portions 17) and 24, 25, 26 (a third group of raised portions 17) all formed of intermediate webs, the density and distribution of which is so selected that a uniform flow of the gas is accomplished in the direction of the arrows as shown in FIG. 3.

As it is also seen in FIG. 3, the above-mentioned intermediate webs have varying lengths and further they are staggered with respect to one another in accordance with a predetermined design. In this manner there are obtained different flow resistances and a corresponding distribution of the gas. The intermediate webs of the rows 23 and 24 are relatively short in order to ensure a fine distribution of the gas flow. The lengths of these webs are designed in such a manner that, together with the webs 27 which contribute only slightly to the uniformity of the gas flow, they cause the gas passing through the webs of the row 23 to split up and arrive as individual streams into the channels formed by the webs 27.

The guide webs 19 arranged at the inlet 13 direct the gas in partial flows in the direction of the rows 21–23 over the face 18 of the layer 2. The intermediate webs of the rows 21–23, in turn, effect a further division of the partial flows and also cause a deflection of these flows of approximately 90° so that the entire zone 28 of the face 18 is covered by gas. Thereafter, by means of the intermediate webs of the rows 24–26 a decreased number of partial flows is formed and these are directed towards the outlet 14 with a deflection of approximately 90°. In this manner, a uniform gas flow is accomplished over the entire face 18.

The flow resistance of this channel system is extremely small so that a large-surface low-pressure electrode may be used.

The parallel and identically long webs 27 have the primary function of giving the electrode sufficient stability and to provide a contacting means. Thus, although the webs 27 participate in rendering the gas flow uniform, they are not essential for guiding the gas streams. The webs 27, similarly to all the other webs, effect an electrical contacting with the graphite foam foil 1. Thus, the raised portions 17 have two functions: first, they provide for the uniform gas distribution and second, they provide for a uniform contacting of the electrode layer 2 and the cell wall 1 which, because of the highly ohmic characteristics of the materials is also of significance.

Figure 4:
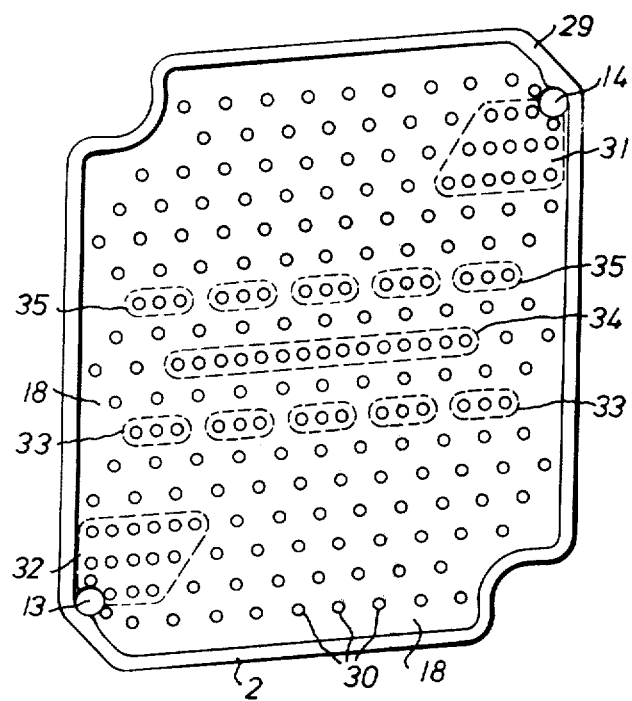
FIG. 4 is a side elevational view, from the gas side, of another embodiment of an active electrode layer.

Turning now to FIG. 4, there is illustrated another embodiment of the channel system formed on the gas-side face of the electrode layer. According to this structure, the anode layer 2 has at its gas-side face 18 raised portions constituted by a great number of dot-like bosses 30. The boss grid formed in this manner has zones 31, 32, 33 and 34 in which the bosses 30 are arranged closer to one another (greater density of boss distribution) so that in these zones higher flow resistances are generated. In this manner it is ensured that the gas flow will not prefer a diagonal direction. It is seen that the boss groups 31 and 32 are located in the vicinity of gas outlet 14 and gas inlet 13, respectively, while the boss groups 33, 34, 35 are located in a middle zone of the entire boss grid. The flow resistances are varied in such a manner that a flow distribution is also effected in the edge zones of the face 18.

The advantages accomplished by the invention reside particularly in that the power/weight ratio of the fuel cell batteries is optimized by virtue of a direct, large-surface contacting of the anode of one cell with the cathode of the successive cell. No external electric connections or the associated current conductors of the individual electrode are needed. Particular current-carrying conductor elements are also not required. The free positioning of the gas inlets and outlets in the active layers of the electrode permits a suspension of the layers without engaging an edge zone thereof. The electrode layers may be manufactured in a simple one-step operation during which the raised portions for forming the channel system may also be provided. Thus, the channel system is obtained without requiring additional material or time. By virtue of the particular shape of the channel system there is obtained a very small flow resistance so that the gas may flow without appreciable pressure loss over the entire gas-side face of the electrode layer. By virtue of the elastic securing of the electrode layers to the graphite foam foil, the latter may operate without mechanical damage which is of great significance with regard to its life expectancy and assembly considerations.

It will be understood that the above description of the present invention is susceptible to various modifications, changes and adaptations and the same are intended to be comprehended within the meaning and range of equivalents of the appended claims.

We claim:

1. A bipolar low-pressure electrode for gas fuel cells, comprising in combination:
   a. a flexible flat graphite foam foil having two opposite faces and being provided with holes for the passage of air and for the passage of fuel gas;
   b. an active electrode layer secured in a face-to-face, electronically contacting relationship directly to each face of said foil, each active electrode layer having a gas-side face oriented towards said foil; one active electrode layer being an anode and the other active electrode layer being a cathode; said holes for the passage of air being situated within the outline of the cathode layer and externally of the outline of the anode layer; said holes for the passage of fuel gas being situated within the outline of the anode layer and externally of the outline of the cathode layer;
   c. a continuous, elevated perimetric edge forming part of each active electrode layer and being in direct contact with and being bonded to said foil for forming an enclosed space between said gas-side face of the active electrode layer and the adjoining face of said foil, said enclosed space constituting a closed gas chamber;
   d. raised portions provided on said gas-side face of each said active electrode layer, said raised portions projecting in the same direction and being of the same height as said elevated perimetric edge, said raised portions forming, with the adjoining face of said foil, a channel system within said closed gas chamber;
   e. means defining throughgoing openings in said active electrode layers for providing access from the outside of said bipolar low-pressure electrode to each gas chamber for delivering air and fuel gas thereto;
   f. first sealing means in engagement with said foil adjacent said anode layer, said first sealing means surrounding said holes for the passage of air; and
   g. second sealing means in engagement with said foil adjacent said cathode layer, said second sealing means surrounding said holes for the passage of fuel gas.

2. A bipolar low-pressure electrode as defined in claim 1 wherein each face of said foil includes a free marginal zone extending externally of the perimeter of said active electrode layer, said zone being free from said throughgoing openings and is constituted by an entirely uninterrupted surface.

3. A bipolar low-pressure electrode as defined in claim 1 wherein said means defining throughgoing openings include first means defining an inlet opening and an outlet opening in said anode layer for providing a gas fuel supply to said bipolar low-pressure electrode and second means defining an inlet opening and an outlet opening in said cathode layer for providing an air supply to said bipolar low-pressure electrode.

4. A bipolar low-pressure electrode as defined in claim 3 wherein said holes in said foil for the passage of air are in alignment with said inlet and outlet openings of said cathode layer, said holes in said foil for the passage of fuel gas are in alignment with said inlet and outlet openings of said anode layer.

5. A bipolar low-pressure electrode as defined in claim 3 wherein said raised portions of said channel system are so arranged that said channel system has zones of different flow resistances.

6. A bipolar low-pressure electrode as defined in claim 5 wherein said raised portions include
   a. a first group disposed adjacent the inlet opening of the active electrode layer for splitting the gas entering said gas chamber into a plurality of oriented partial flows;
   b. a second group disposed spaced from said first group for further splitting said partial flows and for deflecting the latter; and
   c. a third group disposed spaced from said second group for combining said partial flows into a decreased number of streams and deflecting the latter in the direction of the outlet opening of the active electrode layer, whereby the gas flowing from the inlet opening to the outlet opening is substantially uniformly distributed over the entire gas-side face of the active electrode layer.

7. A bipolar low-pressure electrode as defined in claim 5 wherein said raised portions are dot-like bosses constituting a grid field of non-uniform density of boss distribution; said density is the greatest adjacent said inlet and outlet openings and in a middle zone of said channel system.

8. A bipolar low-pressure electrode as defined in claim 1 wherein said raised portions and said perimetric edge on one of said active electrode layers are in respective alignment with said raised portions and said perimetric edge on the other of said active electrode layers.

* * * * *